United States Patent
Hansen (10) Patent No.: US 11,144,184 B2
(45) Date of Patent: Oct. 12, 2021

(54) SELECTION THRESHOLDS IN A VISUALIZATION INTERFACE

(71) Applicant: Mineset, Inc., Milpitas, CA (US)

(72) Inventor: Marc Hansen, Morgan Hill, CA (US)

(73) Assignee: Mineset, Inc., Milpitas, CA (US)

(*) Notice: Subject to any disclaimer, the term of this patent is extended or adjusted under 35 U.S.C. 154(b) by 319 days.

(21) Appl. No.: 14/162,613

(22) Filed: Jan. 23, 2014

(65) Prior Publication Data
US 2015/0205506 A1   Jul. 23, 2015

(51) Int. Cl.
  *G06F 16/26*   (2019.01)
  *G06F 3/0484*   (2013.01)

(52) U.S. Cl.
  CPC .......... *G06F 3/04847* (2013.01); *G06F 16/26* (2019.01)

(58) Field of Classification Search
  CPC ...... G06F 3/00; G06F 3/0482; G06F 3/04842; G06F 3/04847; G06F 3/0488; G06F 3/017; G06F 3/016; G06F 3/04817; G06F 3/04883; G06F 11/3664; G06F 16/29; G06F 16/9535; G06F 3/04815; G06F 3/0481; G06F 3/0484; G06F 3/0485; G06F 3/0486; G06F 3/04886; G06F 11/1469; G06F 11/3636; G06F 16/335; G06F 21/60; G06F 2200/1637; G06F 2203/04804;
  (Continued)

(56) References Cited

U.S. PATENT DOCUMENTS 5,589,401 A   12/1996   Hansen
5,850,213 A   12/1998   Imai et al.
(Continued)

FOREIGN PATENT DOCUMENTS

WO   WO 2012/170535   12/2012
WO   WO 2014/179819   11/2014
(Continued)

OTHER PUBLICATIONS

Streit, M., "3D Parallel Coordinate Systems—A New Data. Visualization Method in the Context of Microscopy-Based Multicolor Tissue Cytometry" © 2006 International Society for Analytical Cytology www.icg.tu-graz.ac.at/Members/bischof/publications/cyt-a.pdf.
(Continued)

*Primary Examiner* — Di Xiao
(74) *Attorney, Agent, or Firm* — Nutter McClennen & Fish LLP (57) ABSTRACT

A user of a graphical visualization program controls what data is selectable through the program interface. Data for display may be grouped and assigned an opacity value. The opacity value may correspond to the number of data points within an n-dimensional grouping, a particular type or other grouping parameter. Two or more data groupings may overlap within the interface. The visualization program may set a threshold selectability level, for example based on user input. The input may be received based on an selection threshold slide bar within a graphical portion of the display. When a user selects a data grouping at a point where two or more data groupings overlap, the data groupings that satisfy the threshold selection level may be selected. Data groupings that do not satisfy the threshold selection level will not be selectable.

33 Claims, 9 Drawing Sheets

(58) Field of Classification Search
CPC ...... G06F 3/013; G06F 3/167; G06F 11/1448;
G06F 11/1451; G06F 11/1464; G06F
16/00; G06F 16/24; G06F 16/27; G06F
16/285; G06F 16/9577
See application file for complete search history.

(56) References Cited

U.S. PATENT DOCUMENTS

| | | | |
|---|---|---|---|
| 5,974,443 A | 10/1999 | Jeske | |
| 6,011,499 A | 1/2000 | Agarwal | |
| 6,014,661 A * | 1/2000 | Ahlberg | G06F 17/30572 |
| 6,037,938 A | 3/2000 | Wolke | |
| 6,200,820 B1 | 3/2001 | Hansen et al. | |
| 6,236,986 B1 | 5/2001 | Gestrelius | |
| 6,405,195 B1 | 6/2002 | Ahlberg | |
| 6,556,225 B1 * | 4/2003 | MacPhail | G06F 17/30994 |
| | | | 707/E17.142 |
| 6,718,347 B1 | 4/2004 | Wilson | |
| 6,748,508 B1 | 6/2004 | Khandelwal et al. | |
| 6,754,385 B2 | 6/2004 | Katsuyama | |
| 6,909,432 B2 | 6/2005 | Alcorn et al. | |
| 7,006,688 B2 | 2/2006 | Zaklika et al. | |
| 7,039,235 B2 | 5/2006 | Katsuyama | |
| 7,058,621 B1 | 6/2006 | Wolge | |
| 7,089,096 B2 | 8/2006 | Liebl et al. | |
| 7,113,186 B2 | 9/2006 | Kim et al. | |
| 7,216,116 B1 | 5/2007 | Nilsson et al. | |
| 7,639,893 B2 | 12/2009 | Duan et al. | |
| 7,697,016 B2 | 4/2010 | Sakakura | |
| 7,779,344 B1 | 8/2010 | Hao et al. | |
| 7,800,613 B2 | 9/2010 | Hanrahan et al. | |
| 7,805,437 B1 | 9/2010 | Andersson et al. | |
| 7,911,481 B1 * | 3/2011 | Ballagh | G09G 5/14 |
| | | | 345/629 |
| 7,917,852 B2 | 3/2011 | Wattenberg et al. | |
| 7,999,809 B2 | 8/2011 | Beers et al. | |
| 8,024,651 B1 * | 9/2011 | Error | G06F 17/30994 |
| | | | 715/212 |
| 8,099,674 B2 | 1/2012 | Mackinlay et al. | |
| 8,127,223 B2 | 2/2012 | Becerra, Sr. et al. | |
| 8,140,586 B2 | 3/2012 | Stolte et al. | |
| 8,190,619 B2 | 5/2012 | Lehtipalo et al. | |
| 8,228,330 B2 | 7/2012 | Aslbury et al. | |
| 8,239,765 B2 | 8/2012 | Aslbury et al. | |
| 8,244,741 B2 | 8/2012 | Wolge | |
| 8,269,777 B2 | 9/2012 | Warner et al. | |
| 8,271,898 B1 | 9/2012 | Mattos et al. | |
| 8,296,654 B2 | 10/2012 | Ahlberg et al. | |
| 8,306,971 B2 | 11/2012 | Stolte et al. | |
| 8,315,473 B1 | 11/2012 | Tao et al. | |
| 8,368,699 B2 | 2/2013 | Aslbury et al. | |
| 8,788,390 B2 | 7/2014 | Jhunjhunwala | |
| 8,862,980 B2 | 10/2014 | MacGregor | |
| 9,280,555 B1 * | 3/2016 | Bono | G06F 16/128 |
| 2002/0021835 A1 | 2/2002 | Andreasson et al. | |
| 2002/0063715 A1 | 5/2002 | Foran | |
| 2002/0148899 A1 | 10/2002 | Brandt et al. | |
| 2003/0012437 A1 | 1/2003 | Zaklika et al. | |
| 2003/0071814 A1 | 4/2003 | Jou et al. | |
| 2003/0122872 A1 | 7/2003 | Chiang et al. | |
| 2004/0145658 A1 | 7/2004 | Lev-Ran et al. | |
| 2004/0170247 A1 * | 9/2004 | Poole | A61B 5/7445 |
| | | | 378/4 |
| 2004/0189724 A1 | 9/2004 | Golibrodski et al. | |
| 2004/0240734 A1 | 12/2004 | Park et al. | |
| 2005/0114130 A1 | 5/2005 | Java et al. | |
| 2005/0190949 A1 | 9/2005 | Weber | |
| 2005/0283494 A1 * | 12/2005 | Colossi | G06F 17/30592 |
| 2006/0026234 A1 | 2/2006 | Chalfin | |
| 2006/0036639 A1 | 2/2006 | Bauerle et al. | |
| 2006/0288284 A1 | 12/2006 | Peters et al. | |
| 2007/0203902 A1 | 8/2007 | Bauerle et al. | |
| 2008/0143751 A1 | 6/2008 | Chosokabe | |
| 2008/0150937 A1 * | 6/2008 | Lundstrom | G06T 15/08 |
| | | | 345/419 |
| 2008/0229256 A1 * | 9/2008 | Shibaike | G06F 3/0483 |
| | | | 715/863 |
| 2008/0247644 A1 | 10/2008 | Weber | |
| 2008/0307334 A1 * | 12/2008 | Chaudhri | G06F 3/048 |
| | | | 715/764 |
| 2009/0002373 A1 | 1/2009 | MacGregor | |
| 2009/0006319 A1 | 1/2009 | Lehtipalo et al. | |
| 2009/0021516 A1 | 1/2009 | Graziani et al. | |
| 2009/0136096 A1 | 5/2009 | Sirohey et al. | |
| 2009/0158181 A1 | 6/2009 | Becerra, Sr. et al. | |
| 2009/0187815 A1 | 7/2009 | Becerra, Sr. et al. | |
| 2009/0287814 A1 * | 11/2009 | Robertson | G06F 17/30994 |
| | | | 709/224 |
| 2009/0319891 A1 | 12/2009 | Mackinlay et al. | |
| 2010/0030518 A1 | 2/2010 | Weber | |
| 2010/0123736 A1 | 5/2010 | Fukudome | |
| 2010/0149305 A1 | 6/2010 | Catchpole et al. | |
| 2010/0242018 A1 | 9/2010 | Balfe et al. | |
| 2010/0253686 A1 | 10/2010 | Alsbury et al. | |
| 2010/0257438 A1 | 10/2010 | Becerra, Sr. et al. | |
| 2010/0309228 A1 | 12/2010 | Mattos et al. | |
| 2011/0164029 A1 | 7/2011 | King et al. | |
| 2011/0289397 A1 | 11/2011 | Eastmond et al. | |
| 2012/0112997 A1 | 5/2012 | Becerra, Sr. et al. | |
| 2012/0117453 A1 | 5/2012 | Mackinlay et al. | |
| 2012/0147130 A1 | 6/2012 | Wagner | |
| 2012/0166140 A1 | 6/2012 | Weber | |
| 2012/0173591 A1 | 7/2012 | Greshfang et al. | |
| 2012/0179713 A1 | 7/2012 | Stolte et al. | |
| 2012/0272186 A1 | 10/2012 | Kraut | |
| 2012/0278365 A1 | 11/2012 | Labat et al. | |
| 2012/0304110 A1 | 11/2012 | Chmiel et al. | |
| 2013/0057721 A1 | 3/2013 | Shmueli et al. | |
| 2013/0127833 A1 | 5/2013 | Davidson | |
| 2013/0132867 A1 | 5/2013 | Morris et al. | |
| 2013/0159863 A1 | 6/2013 | Smith et al. | |
| 2013/0212479 A1 | 8/2013 | Willies et al. | |
| 2013/0239057 A1 * | 9/2013 | Ubillos | G06F 3/04855 |
| | | | 715/833 |
| 2013/0251195 A1 | 9/2013 | Chang et al. | |
| 2013/0275904 A1 * | 10/2013 | Bhaskaran | G06F 3/048 |
| | | | 715/771 |
| 2013/0307767 A1 | 11/2013 | Fujiwara et al. | |
| 2013/0321317 A1 * | 12/2013 | Hirukawa | G06F 3/016 |
| | | | 345/173 |
| 2013/0321421 A1 | 12/2013 | Katz et al. | |
| 2013/0326425 A1 | 12/2013 | Forstall et al. | |
| 2014/0019461 A1 * | 1/2014 | Bredenberg | G06Q 30/02 |
| | | | 707/754 |
| 2014/0049557 A1 * | 2/2014 | Hou | G06F 3/0481 |
| | | | 345/629 |
| 2014/0149947 A1 * | 5/2014 | Blyumen | G06F 17/30 |
| | | | 715/863 |
| 2014/0282160 A1 | 9/2014 | Zarpas | |
| 2014/0310631 A1 | 10/2014 | Harrison et al. | |
| 2014/0330867 A1 | 11/2014 | Sarkar | |
| 2015/0003010 A1 | 1/2015 | Kinstle | |
| 2015/0007079 A1 | 1/2015 | Hansen | |
| 2015/0007087 A1 | 1/2015 | Hansen | |
| 2015/0007096 A1 | 1/2015 | Hansen | |
| 2015/0007111 A1 | 1/2015 | Hansen | |
| 2015/0007113 A1 | 1/2015 | Hansen | |
| 2015/0015570 A1 | 1/2015 | Dries et al. | |
| 2015/0026622 A1 | 1/2015 | Roaldson et al. | |
| 2015/0046862 A1 | 2/2015 | Hansen | |
| 2015/0199105 A1 | 7/2015 | Hansen | |

(56) References Cited

U.S. PATENT DOCUMENTS

2015/0199420 A1 7/2015 Hansen
2015/0205506 A1* 7/2015 Hansen ............... G06F 3/04847
715/771

FOREIGN PATENT DOCUMENTS

WO WO 2015/106213 7/2015
WO WO 2015/106214 7/2015

OTHER PUBLICATIONS

Dang, Tuan Nhon, "Stacking Graphic Elements to Avoid Over-Plotting" IEEE Transactions on Visualization and Computer Graphics, Date of Publication: Nov.-Dec. 2010 (col. 16 No. 6) pp. 1044-1052.
"Packet Switching", http://www.webopedia.com/TERM/P/packet_switching.html.
U.S. Appl. No. 10/899,316 Office Action dated Dec. 19, 2007.
U.S. Appl. No. 10/899,316 Final Office Action dated Aug. 6, 2007.
U.S. Appl. No. 10/899,316 Office Action dated Mar. 28, 2007.
U.S. Appl. No. 10/899,316 Final Office Action dated Jun. 30, 2006.
U.S. Appl. No. 10/899,316 Office Action dated Jan. 11, 2006.
PCT Application No. PCT/US2015/011051 International Search Report and Written Opinion dated Apr. 17, 2015.
U.S. Appl. No. 13/931,806 Office Action dated Apr. 7, 2015.
U.S. Appl. No. 13/931,785 Office Action dated Mar. 16, 2015.
U.S. Appl. No. 13/931,797 Office Action dated Mar. 27, 2015.
U.S. Appl. No. 13/931,788 Office Action dated Mar. 16, 2015.
PCT/US15/11051, Automatic Selection of Center of Rotation for Graphical Scenes, filed Jan. 12, 2015.
PCT/US15/11053, Visually Approximating Parallel Coordinates Data, filed Jan. 12, 2015.
PCT Application No. PCT/US2015/011053 International Search Report and Written Opinion dated Sep. 1, 2015.
TI-Nspire Histogram (http://web.archive.org/web/20120113050430/http://mathbits.com/mathbits/TINSection/Histogram.html; pub date: Jan. 13, 2012.
U.S. Appl. No. 13/931,785 Final Office Action dated Nov. 13, 2015.
U.S. Appl. No. 13/931,797 Final Office Action dated Sep. 25, 2015.
U.S. Appl. No. 13/931,788 Final Office Action dated Nov. 13, 2015.
U.S. Appl. No. 14/042,725 Office Action dated Oct. 16, 2015.
U.S. Appl. No. 14/152,9695 Office Action dated Nov. 3, 2015.
PCT Application No. PCT/US2014/044930 International Search Report and Written Opinion dated Oct. 30, 2014.

* cited by examiner

SELECTION THRESHOLDS IN A VISUALIZATION INTERFACE

BACKGROUND

Field of the Invention

The present invention relates to visualization of data. In particular, the present invention relates to selecting data objects in an interface.

Description of the Prior Art

Visualization of data in three dimensional graphs can be helpful to understand the data. An example of a three dimensional graph is a plot of data on multiple axes, such as a horizontal, vertical, and another coming towards or away from the point of view of a viewer. Typically, visualization applications which display three dimensional data provide an interface having a graphical portion which provides data graphics and a control portion, such as a bar of control buttons. The control buttons may be implemented on a separate page from the graphical portion or otherwise separated from the graphical portion.

Many users desire to select different portions of data at a time to better understand data being visualized. However, it can be cumbersome specify which portions of a visualization should be selectable. What is needed is an improved visualization interface for selecting data as desired by a user.

SUMMARY

The present technology enables a user of a graphical visualization program to control what data is selectable through the program interface. Data for display may be grouped and assigned an initial selectability setting. The selectability setting may be based on nearly any aspect of the data, such as size, volume of data objects, color, property, value, opacity value, and so on. For example, when the selectability is based on opacity level, the opacity value may correspond to the number of data points within a multi dimensional grouping, of a particular type, or some other grouping parameter such that fewer data points in the grouping correspond to a lower opacity. Two or more data objects or groupings may overlap within the interface. The visualization program may set a threshold selectability setting, for example based on user input such as data ranges, threshold values, and other input. The input may be received based on a selectability slide bar within a graphical portion of the display. When a user selects a data object or grouping at a point where two or more data objects or groupings overlap, the data that satisfy the threshold selectability setting may be selected. Data that does not satisfy the threshold selectability setting will not be selectable.

For example, an initial threshold selectability setting may be set to select data groupings with at least ten data points. A selectability slide bar may allow a user to adjust the threshold selectability setting between a value of zero and one hundred. If the selectability setting is changed from the default of ten to fifty, data groups having less than fifty data points may be displayed but will not be selectable in the visualization interface.

An embodiment may perform a method for selecting data by displaying a plurality of data within an interface. Each data, which may include a point, object, grouping, or other data element, may be associated with a selectability level. Input may be received at a position within the interface associated with one or more data of the plurality of data. A determination may be made as to which of one or more displayed data within the interface satisfy a threshold selectability level.

An embodiment may include a system for displaying data. The system may include a processor, a memory, and one or more modules stored in memory. The one or more modules may be executed by the processor to display a plurality of data within an interface, each data associated with a selectability level, receive input at a position within the interface associated with two or more overlapping data of the plurality of data, and determine one or more displayed data within the interface satisfy a threshold selectability level.

DETAILED DESCRIPTION

The present technology enables a user of a graphical visualization program to control what data is selectable through the program interface. Data for display may be grouped and assigned an initial selectability setting. The selectability setting may be based on nearly any aspect of the data, such as size, volume of data objects, color, property, value, opacity value, and so on. For example, when the selectability is based on opacity level, the opacity value may correspond to the number of data points within a multi dimensional grouping, of a particular type, or some other grouping parameter such that the fewer data points in the grouping correspond to a lower opacity. Two or more data objects or groupings may overlap within the interface. The visualization program may set a threshold selectability setting, for example based on user input such as data ranges, threshold values, and other input. The input may be received based on a selectability slide bar within a graphical portion of the display. When a user selects a data object or grouping at a point where two or more data objects or groupings overlap, the data that satisfy the threshold selectability setting may be selected. Data that does not satisfy the threshold selectability setting will not be selectable.

For example, an initial threshold selectability setting may be set to select data groupings with at least ten data points. A selectability slide bar may allow a user to adjust the threshold selectability setting between a value of zero and one hundred. If the selectability setting is changed from the default of ten to fifty, data groups having less than fifty data points may be displayed but will not be selectable in the visualization interface.

Figure 1:
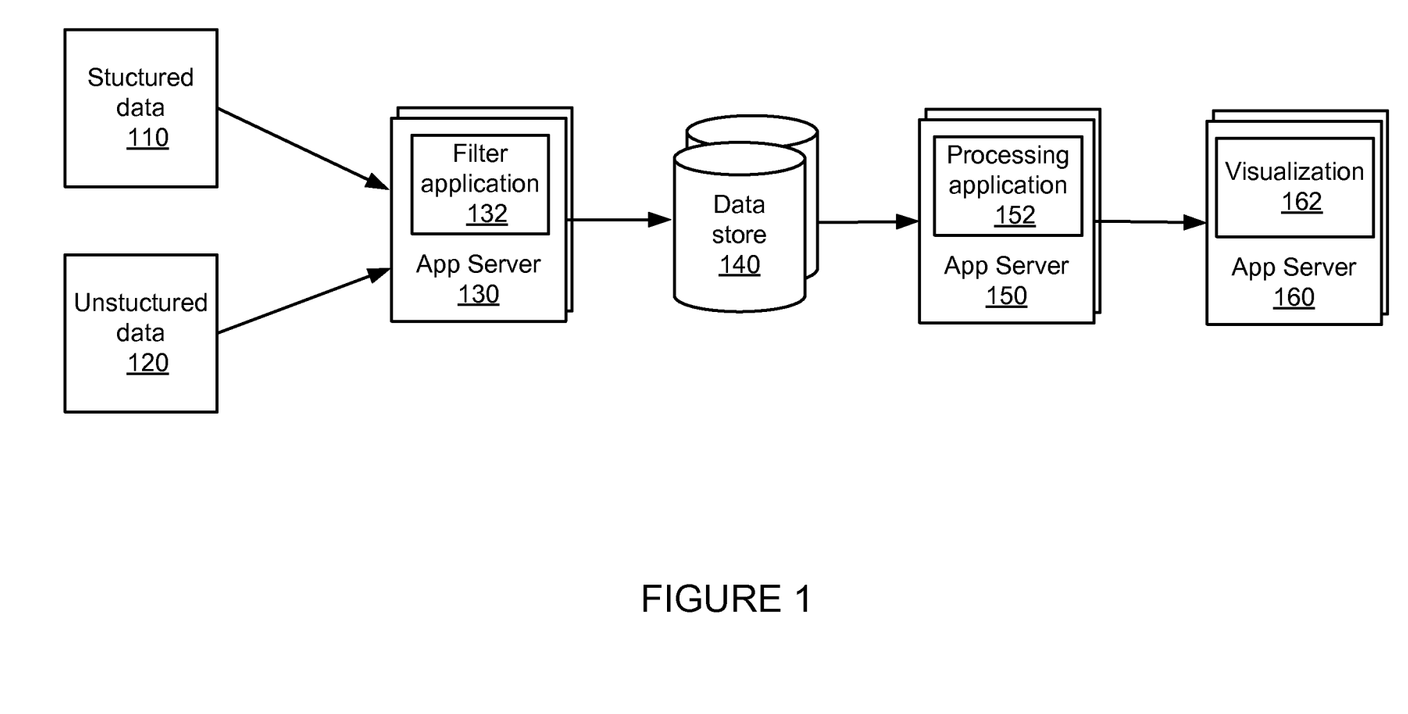
FIG. 1 is a system for processing and visualizing data.

FIG. 1 is a system for processing and visualizing data. The system of FIG. 1 includes structured data 110, unstructured data 120, application servers 130, 150 and 160, and data store 140.

Structured data 110 (RDMS data) may include data items stored in tables. The structured data may be stored in a relational database, and may be formally described and organized according to a relational model. Structured data 110 may be data which can be managed using a relational database management system and may be accessed by application server 130.

Unstructured data may include data that does not include a predefined data model or does not fit into relational tables as structured data 110. Unstructured data may include text, dates, numbers, facts and other data, including email, media and documents. Unstructured data may also include lists or other data associated with web page clicks, shopping cart data, and other data. Unstructured data may be accessed by application server 130.

Application server 130 may include one or more servers which receive and access structured data 110 and unstructured data 120. Filter application 132 may be stored and executed on application server 130, and may be executed to ingest the structured and unstructured data. Filter application 132 may apply filters, intelligence, or other processes to select a subset of the data received and/or accessed.

Data store 140 may include one or more data stores which receive data which has been filtered by filter application 132. Data stores 140 may include SQL servers, NoSQL servers, and other servers. The data may be stored in these servers until they are accessed for processing.

Application server 150 may include one or more servers which receive and/or access data stored in data store 140. Processing application 152 may be stored on application server 150. When executed, processing application 152 may access filtered data from data store 140 and analyze the data for trends, patterns, a particular data of interest, or other data desired for reporting. For example, processing application 152 may be implemented by "Apache Hadoop" software, which is an open source software application that provides a distributed application for analyzing data.

Once data is analyzed, visualization program 162 located on application server 160 may report the data to a user. The data may be provided in many forms, such as reports, visualizations, and other formats. For example, visualization application 162 may provide data in a three dimensional graphical visualization format. In some embodiments, processing application 152 and visualization module 162 may be implemented as part of a client server tool set for extracting data, mining data with analytical algorithms, and providing interactive visualization input.

Figure 2:
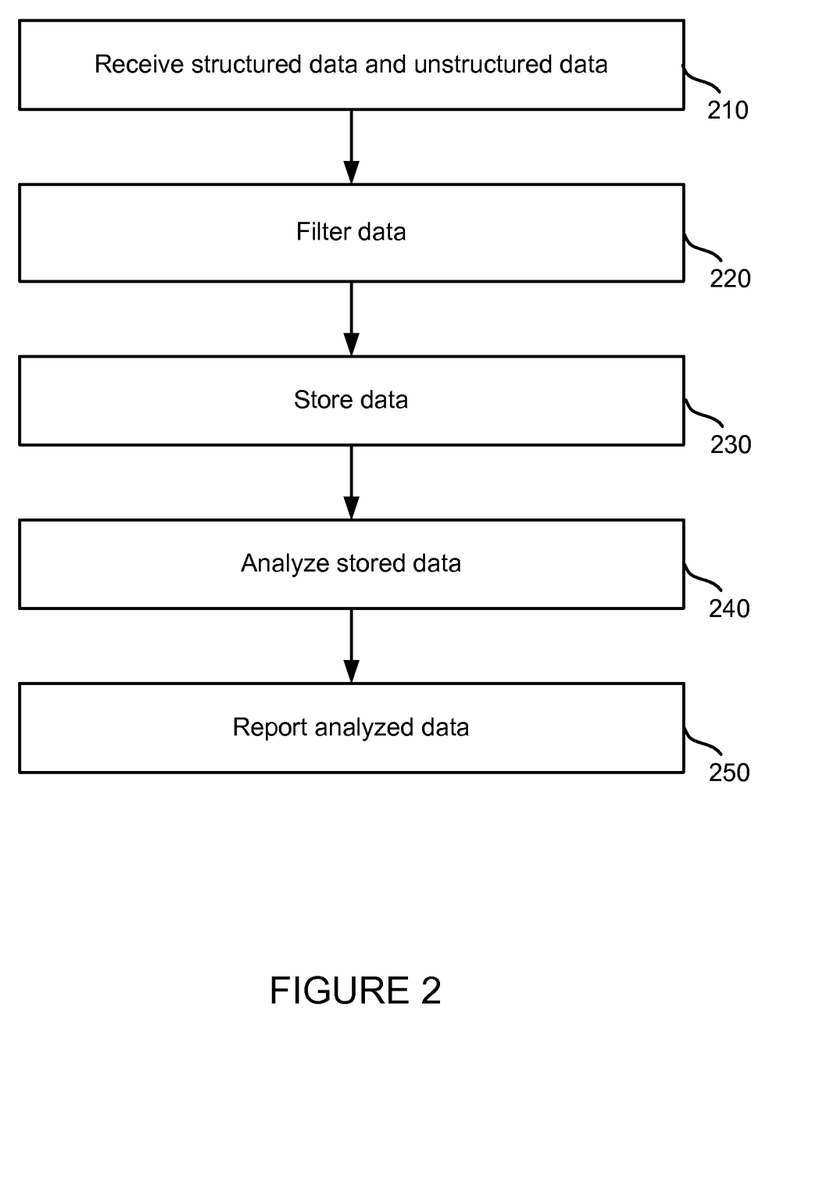
FIG. 2 is a method for processing and visualization data.

FIG. 2 is a method for analyzing and reporting data. The method of FIG. 2 may be performed by the system of FIG. 1. First, structured data and unstructured data may be received at step 210. The data may be received by filter application 132 on application server 130. The received data may be filtered at step 220. Filter application 132 may filter the data by time sampling, applying intelligence, and other methods to result in a subset of the entire set of the received data.

Filtered data may be stored at step 230. The data may be stored based on the type of data it is. For example, structured data may be stored in a SQL database and unstructured data may be stored in a NoSQL database. The stored data may be analyzed at step 240. Analyzing the data may include looking for trends, patterns, or otherwise processing the stored data to determine a subset of data to report to a user. Analyzing the data may be performed by processing application 152 on application server 150. Once the stored data is analyzed, the data can be reported at step 250. The data may be reported through an interactive visualization, reports, or other methods that may be useful to a user. The visualization may present a multi-dimensional graph of data and allow data objects and groupings each associated with an selectability level to be selected based on a threshold selectability setting. Step 250 is discussed in more detail with respect to FIG. 3.

Figure 3:
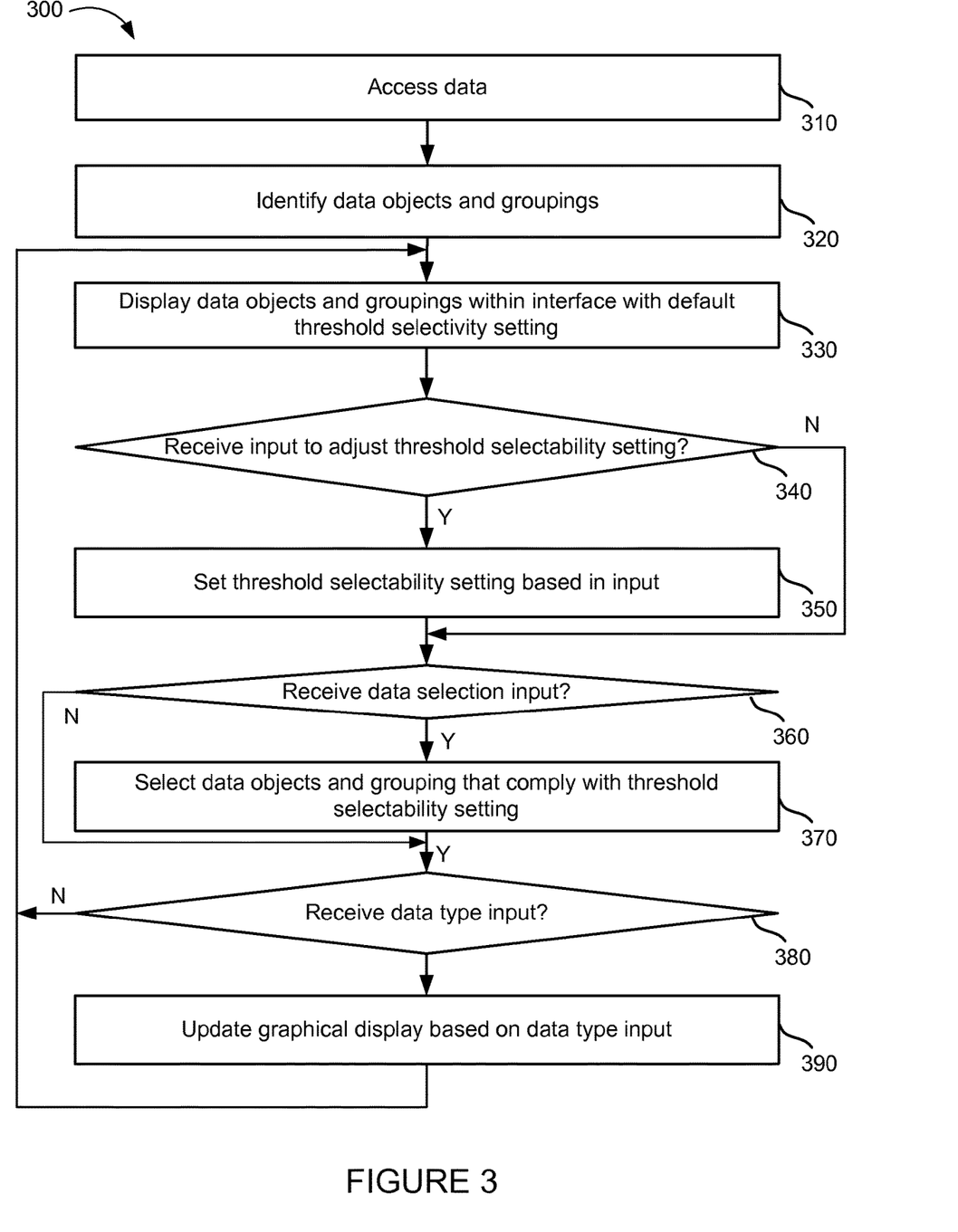
FIG. 3 is a method for providing a data visualization.

FIG. 3 is a method for providing a visualization of data. The method of FIG. 3 may provide more detail for step 250 of the method of FIG. 2. In embodiments, visualization application 162 may perform the steps of FIG. 3. The visualization application 162 may extract stored data, mine data for desired information, and provide an interaction visualization of the data.

Data to be visualized may be accessed at step 310. The data may be accessed locally or remotely, for example from data store 140. Data objects and groupings are identified at step 320. The groupings may be formed from data points (i.e., data objects) in multi-dimensional space, such that each grouping includes one or more data points that are within a threshold distance from each other in the multi-dimensional space. In some instances, in addition to location, groupings may be formed based on data values, data type, or other aspects of the data.

When identified, each data object and data grouping may be assigned a selectability value. The selectability value may correspond to a parameter of the data object or grouping and may control how the object is selectable. In some instances, the selectability of a data object or data grouping may be visually represented by opacity. For example, the opacity value for a grouping may correspond to the number of data points within the grouping.

In some instances, each grouping may be assigned a selectability level based on some other aspect of the data besides data volume, such as an entropy value for a bin of data, the number of data points per bin, a particular file in a record, color of the data, size of an object or grouping, or other data values. In some instances, the selectability may be associated with individual data points rather than bins of data, and selectability may relate to a particular field of each data point.

The data objects and groupings may be displayed within the interface of the visualization program with a default threshold opacity level at step 330. The threshold selectability level may control what data objects and groupings are selectable within the interface. For example, a default selectability setting may be set to ten. With this default setting, any data having fewer than a selectability value of ten (however that is determined, for example by a field value, volume, and so forth) would not be selectable in the interface. In some instances, the default may be user settable or saved as part of each particular visualization.

Figure 4:
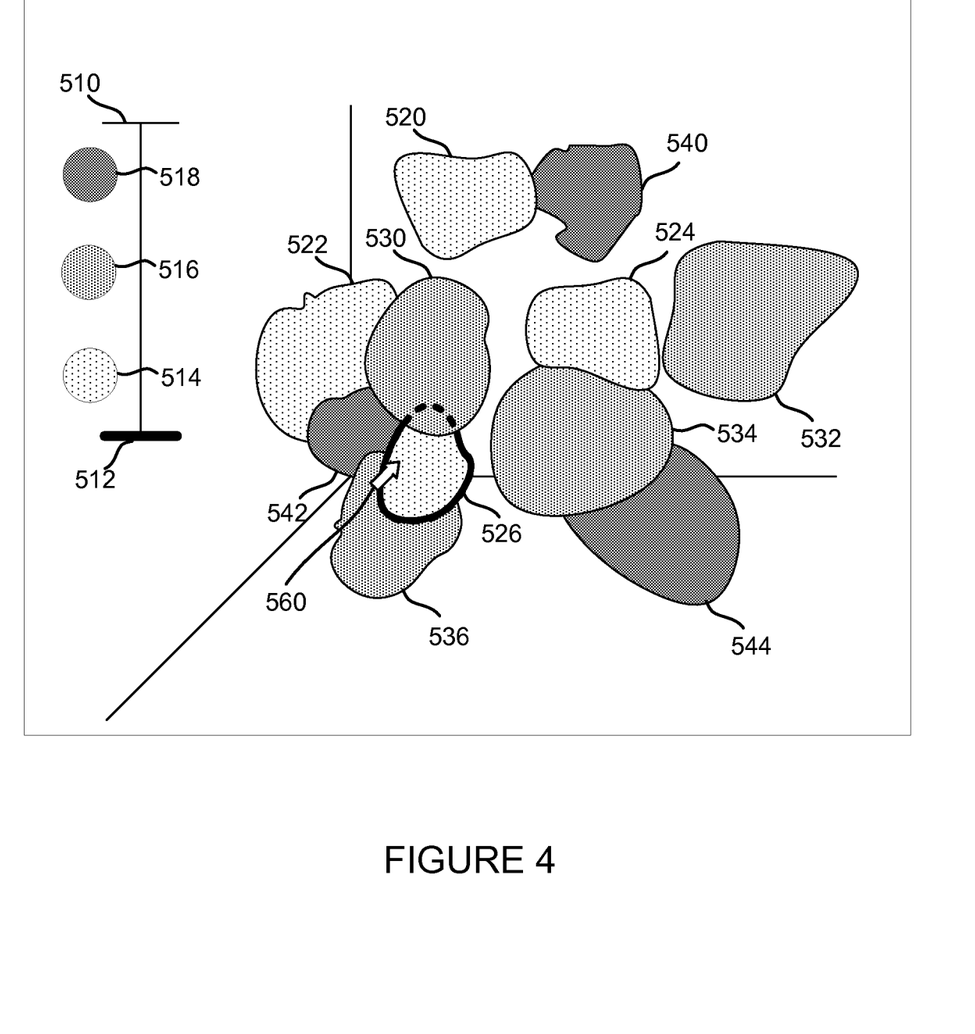
FIG. 4 is a visualization interface having a selectability control bar.
Figure 5:
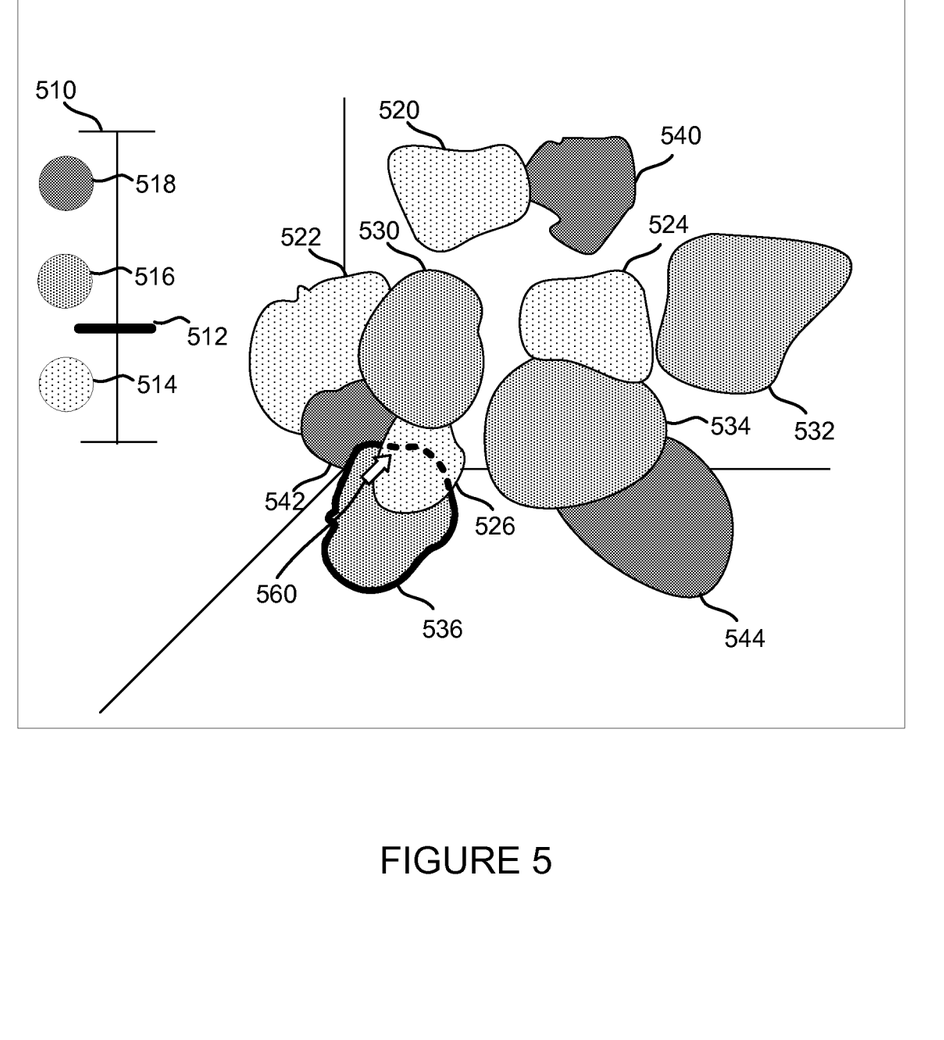
FIG. 5 is another example of a visualization interface having a selectability control bar.
Figure 6:
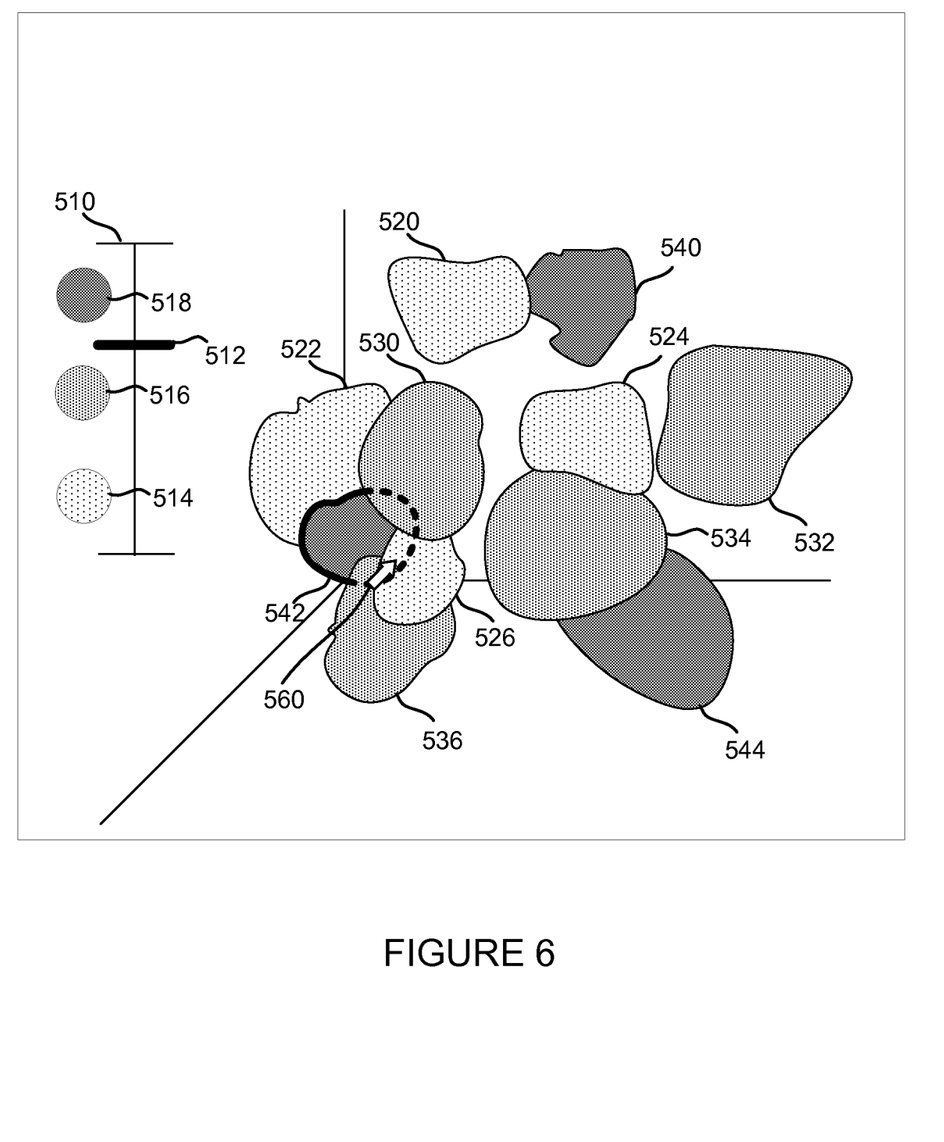
FIG. 6 is another example of a visualization interface having a selectability control bar.

A determination is made as to whether input is received to adjust the threshold selectability level at step 340. The input may be received graphically, such as for example by sliding a selectability indicator along a selectability slide. An example of a selectability indicator that may be slid along a selectability slide is illustrated in FIGS. 4-6. If no input is received, the method of FIG. 3 continues to step 360.

If input is received to adjust the threshold selectability level, the threshold selectability level is updated based on the input at step 350. In some implementations, as the selectability indicator is adjusted, selectable data groupings or data objects may be modified. For example, a selectable data grouping in a collection of overlapping data groupings may be highlighted or otherwise modified with respect to their representation in the interface.

In some instances, the input may be received as moving a slider along a bar. A "splat" or other graphical representation of data may be displayed next to the slider, for example to the left, right, top or bottom of the slider. As the slider is moved along the bar to select a different selectability level, the splat will move with the slider and change selectability. Thus, when the slider is at one end of the bar, the splat will be displayed next to the slider and have a first value that represents a selectability threshold set by the particular position of the slider. At the other end of the bar, the splat will be still displayed next to the slider, at the slider's new position, and have a new value that represents a selectability threshold set by the new particular position of the slider.

A determination is made as to whether input to select a data grouping or data object is received at step 360. If no input is received, the method continues to step 380. If input is received at step 360, data that complies with the threshold selectability level is selected at step 370. The input may be received at a particular point in the interface, for example at a point selected by a cursor. In some instances, when two or more data groupings or objects are overlapping at the selected point, only a data object or grouping that includes the selected point and satisfies the threshold selectability level may be selected. For example, if a threshold selectability level is set to fifty, a first data grouping has an selectability level of thirty, a second data grouping has a selectability level of seventy, and both the first data grouping and the second data grouping cover a particular point in the interface, the second data grouping will be selected in response to user input selecting the particular point in the interface that overlaps both data groupings. After selecting the appropriate data grouping at step 370, the method continues to step 380.

A determination is made as to whether the input is received to display a particular data type at step 380. In some embodiments, input may be received to display data having a certain data filed, certain data values, data from a particular source, or data having some other aspect or parameter. The input may be received via a slide bar, such as for example that shown in FIGS. 7-8. If input is not received to display a particular data type, the method of FIG. 3 returns to step 330. If input is received to display a particular data type, then the graphical display is updated based on the data type input at step 390. In some embodiments, the data types displayed may be updated to display only the selected data type. In some embodiments, the data type may be updated to display all data types except the selected data type. The method of FIG. 3 may then continue to step 330.

FIGS. 4-6 illustrate examples of a visualization interface for displaying multi-dimensional data. FIG. 4 is a visualization interface having a selectability slide. The interface of FIG. 4 may include selectability slide 510 and data groupings 520-544. Selectability slide 510 includes selectability indicator 512 and selectability level indicators 514, 516 and 518. Selectability level indicator 514 is associated with a range of selectability values associated with data groupings 520, 522, 524 and 526, selectability level indicator 516 is associated with a range of selectability values associated with data groupings 530, 532, 534 and 536, and selectability level indicator 518 is associated with a range of selectability values associated with data groupings 540, 542, and 544. Selectability indicator 512 may be moved along selectability slide 510 to set a threshold selectability level. The slide may be used to determine what data groupings are selectable within the interface based on threshold selectability setting.

In the interface of FIG. 4, a cursor 560 is positioned to select a point within the interface of FIG. 4. The point, located at the tip of the cursor, is at a position where three data groupings—data groupings 526, 536, and 542—overlap. The selectability indicator is set to a value below selectability level indicators 514, 516 and 518. As such, all data groupings and objects associated with those indicators will be selectable. As a result, the data grouping at the top of the overlapping data groupings will be selected at the point associated with cursor 560. In FIG. 4, this corresponds to data grouping 526, which is highlighted in the interface of FIG. 4.

FIG. 5 is another example of a visualization interface having a selectability control bar. In the interface of FIG. 5, the selectability indicator 512 is set below the selectability level indicators 516 and 518 but above selectability level indicator 514. Data groupings and objects having a selectability level less than selectability indicator 516 will not be selectable in the interface of FIG. 5 based on the threshold selectability level set by indicator 514. In particular, data grouping 526 is not selectable and cursor 560 may be used to select the next highest data grouping at the point of the cursor—this corresponds to data grouping 536, which is highlighted in the interface of FIG. 5.

FIG. 6 is another example of a visualization interface having a selectability control bar. In the interface of FIG. 5, the selectability indicator 512 is set below the selectability level indicator 518 but above selectability level indicators 514 and 516. Based on the indicator level, the threshold selectability level set by the indicator would prevent data groupings 526 and 536 from being selectable (these data groupings have selectability levels associated with selectability level indicators 514 and 516). Though they encompass they point selected by cursor 560, data groupings 526 and 536 are not selectable because they do not satisfy the threshold selectability level. Therefore, data grouping 542 would be selected by cursor 560 in the interface of FIG. 6.

In each of FIGS. 4-6, a single slider is used to control the selectability selections. This is intended as an example only. A visualization interface of the present technology may have one or more sliders to control selection based on selectability or any other property, for example to allow selection within a narrower range of values.

In some instances, the selectability sliders may control data ranges for columns not represented in the visualization. For example, in a car data visualization, a slider may set a range such that 2010-2015 models are selectable, even though model year isn't mapped to anything in the visualization. Conversely, the selection range sliders could represent columns that are mapped to visual parameters, such as color ranges (where, e.g., color represents mpg) or size ranges (where size represents # cylinders).

Figure 7:
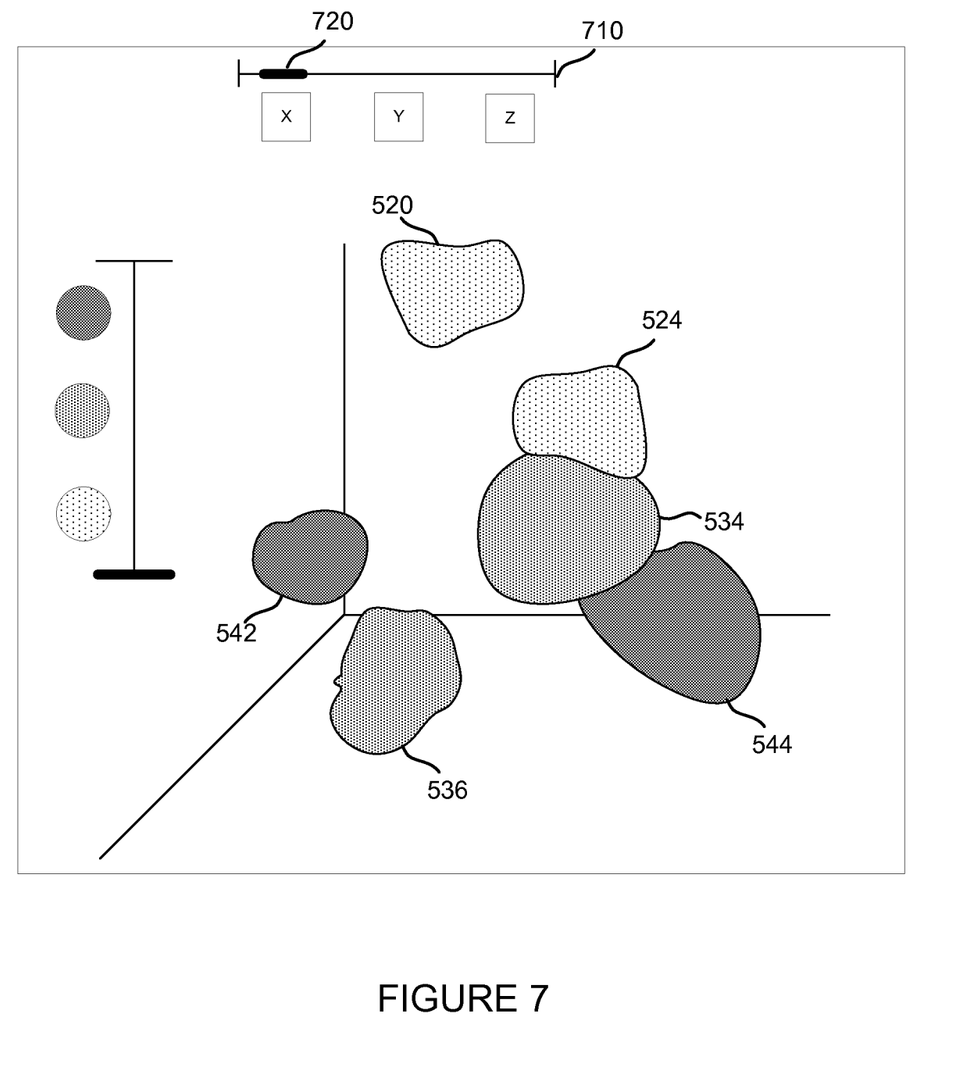
FIG. 7 is a visualization interface having data type selection buttons.
Figure 8:
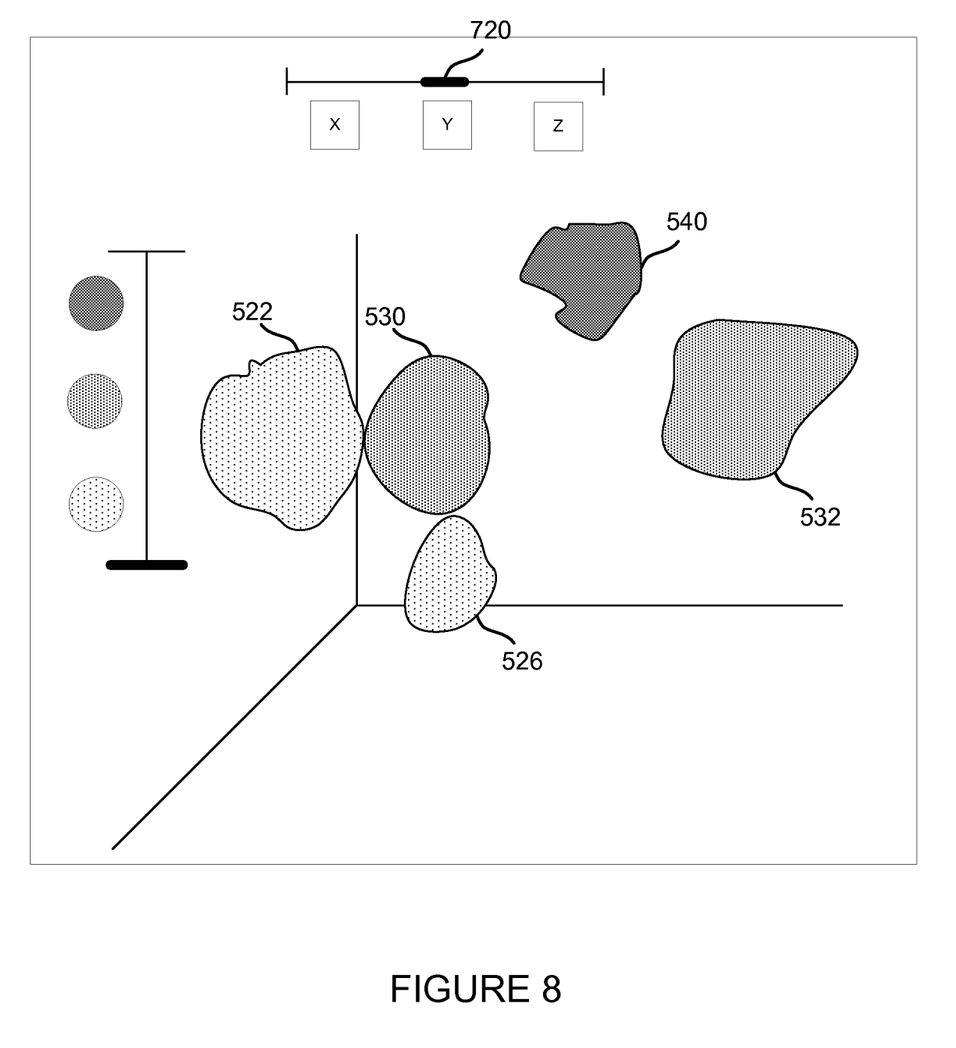
FIG. 8 is another visualization interface having data type selection buttons.

FIG. 7 is a visualization interface having data type selection buttons. The interface of FIG. 7 includes data groupings 520, 524, 534, 536, 542 and 544, data type slide 710 and data type indicator 720. The data type indicator 720 may be moved across slide 710 to select different types of data to be selectable (or not selectable). For example, the values for X, Y, and Z illustrated near the slide in FIG. 7 may be 0.1, 0.5, and 1.0, respectively. In FIG. 7, data type indicator 720 is set to a first position. While at this position, data groupings 520, 524, 534, 536, 542 and 544 associated with that type of data are selectable. FIG. 8 is another visualization interface having data type selection buttons. In FIG. 8, data type indicator 720 is set to a second position. While at this position, data groupings 522, 526, 530, 534, and 540 associated with that of data are selectable.

In some instances, the present technology may be used to set selectability thresholds based on any data range, including but not limited to data mapped to opacity. For example, the present technology may display data in all different colors and sizes, but set multiple selection range sliders to only allow the user to select medium-sized red data objects. In some instances, a selection threshold may be set for an attribute with no graphical mapping at all, just using data ranges that may be in the data. The present technology may also be used to fade in or out the unselectable data or highlight the selectable data, if it made it easier to see whether the selection thresholds were set correctly.

Figure 9:
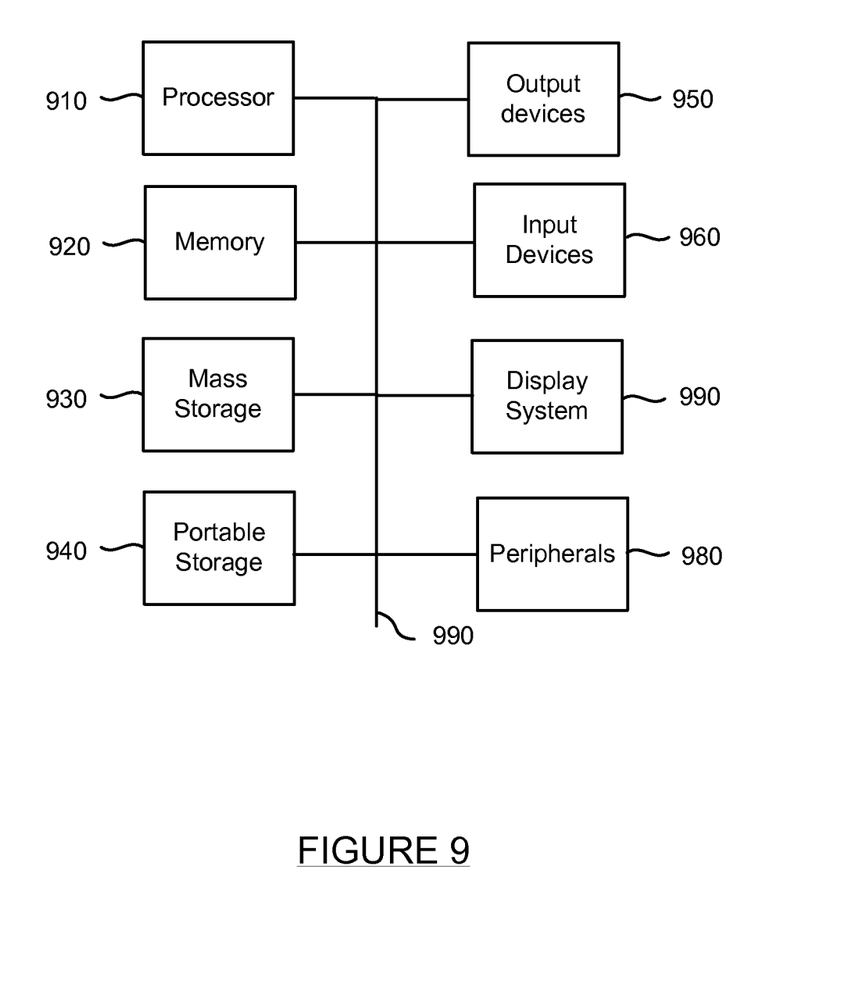
FIG. 9 illustrates a computing device for implementing the present technology.

FIG. 9 provides a computing device for implementing the present technology. Computing device 900 may be used to implement devices such as for example application servers 130, 150 and 160 and data stores 140. FIG. 9 illustrates an exemplary computing system 900 that may be used to implement a computing device for use with the present technology. System 900 of FIG. 9 may be implemented in the contexts of the likes of client computer 210, servers that comprise services 230-250 and 270-280, application server 260, and data store 267. The computing system 900 of FIG. 9 includes one or more processors 910 and memory 920. Main memory 920 stores, in part, instructions and data for execution by processor 910. Main memory 920 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 990. However, the components may be connected through one or more data transport means. For example, processor unit 910 and main memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive or an optical disk drive, is a non-volatile storage device for storing data and instructions for use by processor unit 910. Mass storage device 930 can store the system software for implementing embodiments of the present invention for purposes of loading that software into main memory 920.

Portable storage device 940 operates in conjunction with a portable non-volatile storage medium, such as a floppy disk, compact disk or Digital video disc, to input and output data and code to and from the computer system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, or a pointing device, such as a mouse, a trackball, stylus, or cursor direction keys. Additionally, the system 900 as shown in FIG. 9 includes output devices 950. Examples of suitable output devices include speakers, printers, network interfaces, and monitors. In some embodiments, a touch screen may be used to receive input from a user. The touch screen may receive input such as selection of an indicator along a slide bar illustrated in a visualization display as well as other input Display system 970 may include a liquid crystal display (LCD) or other suitable display device. Display system 970 receives textual and graphical information, and processes the information for output to the display device.

Peripherals 980 may include any type of computer support device to add additional functionality to the computer system. For example, peripheral device(s) 980 may include a modem or a router.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method of displaying data, comprising:
displaying a plurality of data sets within an interface, each of the data sets comprising data from one or more data points, wherein each of the data sets:
(i) is associated with a different selectability value,
(ii) defines a boundary, and
(iii) has a different order within the interface, wherein boundaries of two or more data sets overlap within the interface to define an overlapping portion;
setting a threshold selectability value;
receiving an input, within the interface, at an input position within the overlapping portion of the two or more data sets, the two or more data sets that have the input position within the overlapping portion defining potentially selected data sets; and
determining, in response to the input within the overlapping portion of the two or more data sets, whether one or more of the potentially selected data sets within the interface satisfy the threshold selectability value,
wherein determining includes identifying a first data set positioned at least partially underneath a second data set, the first data set having a selectability value that satisfies the threshold and the second data set having a selectability value that does not satisfy the threshold.

2. The method of claim 1, wherein each of the data sets includes a data object or a data grouping.

3. The method of claim 2, wherein the selectability value for a grouping is generated based on the number of data points within the grouping.

4. The method of claim 2, wherein determining includes identifying a first data grouping positioned underneath a second data grouping, the first data grouping satisfying the threshold selectability value and the second data grouping not satisfying the threshold selectability value.

5. The method of claim 1, wherein the threshold selectability value is set by an input received from a user.

6. The method of claim 5, wherein the input from the user to set the threshold selectability value is received by graphically manipulating an indicator in the interface.

7. The method of claim 6, wherein the indicator for setting the threshold selectability value is an icon along a slide bar.

8. The method of claim 7, wherein the data type input is received by graphically sliding a second indicator along a second bar.

9. The method of claim 1, wherein the input is received through a graphical interface.

10. The method of claim 1, further comprising:
identifying one or more groupings of data from a plurality of data points; and
assigning an opacity value to each grouping.

11. The method of claim 1, further comprising:
receiving input to select a data type; and
updating the graphical display based on the selected data type.

12. A product comprising a tangible, non-transient computer usable medium having computer readable program code thereon, the code being executable by a processor and comprising:
program code for displaying a plurality of data sets within an interface, each of the data sets comprising data from one or more data points wherein each of the data sets;
(i) is associated with a different selectability value;
(ii) defines a boundary, and
(iii) has a different order within the interface, wherein boundaries of two or more data sets overlap within the interface to define an overlapping portion;
program code for receiving a selection of a threshold selectability value;
program code for receiving an input, within the interface, at an input position within the overlapping portion of two or more data sets, the two or more data sets that have the input position within the overlapping portion defining potentially selected data sets; and
program code for determining, in response to the input within the overlapping portion of the two or more data sets, one or more of the potentially selected data sets within the interface that satisfy the threshold selectability value,
wherein determining includes identifying a first data set positioned at least partially underneath a second data set, the first data set having a selectability value that satisfies the threshold and the second data set having a selectability value that does not satisfy the threshold.

13. The product as defined by claim 12, wherein each of the data sets includes a data object or a data grouping.

14. The product as defined by claim 13, wherein the selectability value for a grouping is generated based on the number of data points within the grouping.

15. The product as defined by claim 13, wherein determining includes identifying a first data grouping positioned underneath a second data grouping, the first data grouping satisfying the threshold selectability value and the second data grouping not satisfying the threshold selectability value.

16. The product as defined by claim 13, further comprising:
program code for identifying one or more groupings of data from a plurality of data points; and
program code for assigning a selectability value to each grouping.

17. The product as defined by claim 12, wherein the threshold selectability value is set by an input received from a user.

18. The product as defined by claim 17, wherein the input from the user to set the threshold selectability value is received by graphically manipulating an indicator in the interface.

19. The product as defined by claim 18, wherein the indicator is an icon along a slide bar.

20. The product as defined by of claim 19, wherein the data type input is received by graphically sliding a second indicator along a second bar.

21. The product as defined by claim 12, wherein the input is received through a graphical interface.

22. The product as defined by claim 12, further comprising:
program code for receiving input to select a data type; and
program code for updating the graphical display based on the selected data type.

23. An apparatus for displaying data, the apparatus comprising:
a graphical user interface configured to display a plurality of data sets within an interface, each of data sets comprising data from one or more data points, where each of the data sets (i) is associated with a different selectability value, (ii) defines a boundary, and (iii) has a different order within the interface, wherein boundaries of two or more data sets overlap within the interface to define an overlapping portion;
a receiving input operably coupled to the graphical user interface, the receiving input being configured to receive input at a position, within the interface, at an input position within the overlapping portion of the two or more data sets, the two or more data sets that have the input position within their boundary defining potentially selected data sets; and
a selector operably coupled with the receiving input, the selector configured to select, in response to the input within the boundary of the two or more data sets, one or more of the potentially selected data sets within the interface that satisfy the threshold selectability value,
wherein selecting includes identifying a first data set positioned at least partially underneath a second data set, the first data set having a selectability value that satisfies the threshold and the second data set having a selectability value that does not satisfy the threshold selectability valued.

24. The apparatus as defined by claim 23, wherein each of the data sets includes a data object or a data grouping.

25. The apparatus as defined by claim 24, wherein the selectability value for a grouping is generated based on the number of data points within the grouping.

26. The apparatus as defined by claim 24, the one or more modules further executable to identify a first data grouping positioned underneath a second data grouping, the first data grouping satisfying the threshold selectability value and the second data grouping not satisfying the threshold selectability value.

27. The apparatus as defined by claim 23, wherein the threshold selectability value is set by an input received from a user.

28. The apparatus as defined by claim 27, wherein the input to set the threshold selectability value is received by graphically manipulating an indicator in the interface.

29. The apparatus as defined by claim 28, wherein the indicator includes an icon along a slide bar.

30. The apparatus as defined by 29, wherein the data type input is received by graphically sliding a second indicator along a second bar.

31. The apparatus as defined by claim 23, wherein the input is received through a graphical interface.

32. The apparatus as defined by claim 23, the one or more modules further executable to identify one or more groupings of data from a plurality of data points, and assign a selectability value to each grouping.

33. The apparatus as defined by claim 23, the one or more modules further executable to receive input to select a data type and update the graphical display based on the selected data type.

\* \* \* \* \*